(12) United States Patent
Li et al.

(10) Patent No.: US 12,341,577 B2
(45) Date of Patent: Jun. 24, 2025

(54) DISTRIBUTED ANTENNA SYSTEM AND SIGNAL TRANSMISSION METHOD

(71) Applicant: COMBA NETWORK SYSTEMS COMPANY LIMITED, Guangdong (CN)

(72) Inventors: Xin Li, Guangdong (CN); Manjiang Luo, Guangdong (CN); Shaohu Fang, Guangdong (CN); Jinqing Zhou, Guangdong (CN); Quan Lai, Guangdong (CN)

(73) Assignee: COMBA NETWORK SYSTEMS COMPANY LIMITED, Guangzhou (CN)

( * ) Notice: Subject to any disclaimer, the term of this patent is extended or adjusted under 35 U.S.C. 154(b) by 46 days.

(21) Appl. No.: 18/275,044

(22) PCT Filed: Dec. 7, 2021

(86) PCT No.: PCT/CN2021/136205
§ 371 (c)(1),
(2) Date: Jul. 31, 2023

(87) PCT Pub. No.: WO2022/160950
PCT Pub. Date: Aug. 4, 2022

(65) Prior Publication Data
US 2024/0088949 A1    Mar. 14, 2024

(30) Foreign Application Priority Data
Jan. 29, 2021    (CN) .......................... 202110129682.6

(51) Int. Cl.
*H04B 7/0413*    (2017.01)
*H04W 28/02*    (2009.01)

(52) U.S. Cl.
CPC ...... *H04B 7/0413* (2013.01); *H04W 28/0215* (2013.01)

(58) Field of Classification Search
CPC .......... H04B 7/024; H04B 7/022; H04B 1/40; H04B 10/25753; H04B 7/0413;
(Continued)

(56) References Cited

U.S. PATENT DOCUMENTS 6,771,933 B1 * 8/2004 Eng ..................... H04W 88/085
  455/562.1
6,801,767 B1 * 10/2004 Schwartz ......... H04B 10/25755
  455/426.2
(Continued)

FOREIGN PATENT DOCUMENTS

CN    101394647 A    3/2009
CN    103199975 A    7/2013
(Continued)

OTHER PUBLICATIONS

International Search Report of PCT Patent Application No. PCT/CN2021/136205 issued on Feb. 23, 2022.

*Primary Examiner* — Eva Y Puente

(57) ABSTRACT

The present disclosure relates to a distributed antenna system and a signal transmission method. A first remote cascaded chain corresponding to a first channel set and a second remote cascaded chain corresponding to a second channel set are obtained by means of division, such that when a distributed antenna system needs to support multi-channel MIMO, remote units in the first remote cascaded chain and remote units in the second remote cascaded chain only need to be configured with communication link modules, the number of which is less than the number of channels, and the multi-channel MIMO is jointly supported by using the remote units in the first remote cascaded chain and the
(Continued)

remote units in the second remote cascaded chain, such that the multi-channel MIMO capability of an overlapping region can be realized.

11 Claims, 5 Drawing Sheets

(58) Field of Classification Search
CPC ...... H04B 7/26; H04B 7/0602; H04B 7/0802; H04W 88/085; H04W 72/23; H04W 24/02; H04W 24/10; H04W 72/0453; H04W 24/08; H04W 72/21; H04W 88/08; H04W 52/146; H04L 5/0048; H04L 5/0023; H04L 5/14; H04L 5/0053; H04L 5/0035; H04L 25/0224; H04L 5/0051; H04L 5/005; H04L 5/0094
USPC ........................................................ 375/262
See application file for complete search history.

(56) References Cited

U.S. PATENT DOCUMENTS

| | | | |
|---|---|---|---|
| 2020/0374981 A1 | 11/2020 | Hoffmann et al. | |
| 2021/0328664 A1* | 10/2021 | Schwab | H04B 7/026 |
| 2024/0349085 A1* | 10/2024 | Dussmann | H04W 28/0236 |

FOREIGN PATENT DOCUMENTS

| | | |
|---|---|---|
| CN | 103384155 A | 11/2013 |
| CN | 106304118 A | 1/2017 |
| CN | 110278011 A | 9/2019 |
| EP | 3297314 A1 | 3/2018 |

* cited by examiner

DISTRIBUTED ANTENNA SYSTEM AND SIGNAL TRANSMISSION METHOD

The present disclosure is a national stage application of PCT international application No. PCT/CN2021/136205 filed on Dec. 7, 2021, which claims priority to Chinese Patent Application No. 202110129682.6, filed with the China Patent Office on Jan. 29, 2021, and entitled "DISTRIBUTED ANTENNA SYSTEM AND SIGNAL TRANSMISSION METHOD", the entire contents of both of which are incorporated herein by reference.

TECHNICAL FIELD

The present disclosure relates to the field of communication technologies, and in particular, to a distributed antenna system and a signal transmission method.

BACKGROUND

In the era of 5th generation mobile networks or 5th generation wireless systems (5G), as mobile communication services generally occur in indoor scenarios, an indoor mobile communication network has gradually become a focus of mobile communication network construction.

FIG. 1 is a schematic structural diagram of a distributed antenna system a that can meet a requirement of an indoor mobile communication network in the prior art. As shown in FIG. 1, the distributed antenna system a 200 includes: a digital-to-analog extended unit a 201 and a remote cascaded chain. The remote cascaded chain includes a plurality of remote units a 202 in cascaded connection through a radio frequency cable, and a first-stage remote unit a 202 in the remote cascaded chain is connected to the digital-to-analog extended unit a 201 through a radio frequency cable.

However, when the distributed antenna system a 200 in FIG. 1 is required to support multi-channel Multi-Input Multi-Output (MIMO), each remote unit a 202 needs to be correspondingly provided with communication link modules, the number of which is the same as the number of channels, so that the cost of the system may increase as the number of channels increases, and power consumption of the system is increased, which is not conducive to the construction of the distributed antenna system.

SUMMARY

In a first aspect, the present disclosure provides a distributed antenna system, including: a digital-to-analog extended unit, a first remote cascaded chain corresponding to a first channel set, and a second remote cascaded chain corresponding to a second channel set. Remote units in the first remote cascaded chain are arranged adjacent to remote units in the second remote cascaded chain. A first-stage remote unit in the first remote cascaded chain is connected to the digital-to-analog extended unit through a radio frequency cable, and a first-stage remote unit in the second remote cascaded chain is connected to the digital-to-analog extended unit through a radio frequency cable.

The digital-to-analog extended unit is configured to perform a baseband processing operation and a digital-to-analog conversion operation on a downlink digital radio frequency signal transmitted by a source unit through an optical fiber to obtain at least one first downlink analog radio frequency signal and at least one second downlink analog radio frequency signal, transmit the at least one first downlink analog radio frequency signal to the first remote cascaded chain through a radio frequency cable, and transmit the at least one second downlink analog radio frequency signal to the second remote cascaded chain through a radio frequency cable.

The first remote cascaded chain performs analog radio frequency signal interaction with a terminal device based on the at least one first downlink analog radio frequency signal, and two adjacent remote units in the first remote cascaded chain perform analog radio frequency signal interaction through a radio frequency cable.

The second remote cascaded chain performs analog radio frequency signal interaction with the terminal device based on the at least one second downlink analog radio frequency signal, and two adjacent remote units in the second remote cascaded chain perform analog radio frequency signal interaction through a radio frequency cable.

The first remote cascaded chain transmits the at least one first uplink analog radio frequency signal to the digital-to-analog extended unit through a radio frequency cable.

The second remote cascaded chain further transmits the at least one second uplink analog radio frequency signal to the digital-to-analog extended unit through a radio frequency cable.

The digital-to-analog extended unit further performs an analog-to-digital conversion operation and a baseband processing operation on the at least one first uplink analog radio frequency signal and the at least one second uplink analog radio frequency signal to obtain an uplink digital radio frequency signal, and transmit the uplink digital radio frequency signal to the source unit through an optical fiber.

Through the distributed antenna system in the first aspect, a first remote cascaded chain corresponding to a first channel set and a second remote cascaded chain corresponding to a second channel set are obtained by means of division, such that when the distributed antenna system needs to support multi-channel MIMO, remote units in the first remote cascaded chain and remote units in the second remote cascaded chain only need to be configured with communication link modules, the number of which is less than the number of channels, and the multi-channel MIMO is jointly supported by using the remote units in the first remote cascaded chain and the remote units in the second remote cascaded chain, such that the multi-channel MIMO capability of an overlapping region can be realized, thereby reducing the device cost of the remote units and also reducing the construction cost of the system, and facilitating the improvement of the construction of the system.

In a possible design, the digital-to-analog extended unit includes: an optical transceiver module, a baseband processing module, a signal conversion module, and a radio frequency front-end module successively connected. The radio frequency front-end module is respectively connected to the first-stage remote unit in the first remote cascaded chain and the first-stage remote unit in the second remote cascaded chain. The optical transceiver module performs optical signal interaction with the source unit. The baseband processing module performs a baseband processing operation on a received signal. The signal conversion module performs digital radio frequency signal interaction with the baseband processing module, and performs analog radio frequency signal interaction with the radio frequency front-end module. The radio frequency front-end module performs analog radio frequency signal processing with the first-stage remote unit in the first remote cascaded chain and the first-stage remote unit in the second remote cascaded chain. Therefore, a possible design is provided for the digital-to-analog extended unit, which realizes communication connection between the source unit and the remote cascaded chain.

In a possible design, the digital-to-analog extended unit further includes: a first monitoring circuit, a power supply circuit, a first coupler, and a second coupler. The first coupler is connected to the baseband processing module, the radio frequency front-end module, the first monitoring circuit, the power supply circuit, and the first-stage remote unit in the first remote cascaded chain, respectively. The second coupler is connected to the baseband processing module, the radio frequency front-end module, the first monitoring circuit, the power supply circuit, and the first-stage remote unit in the second remote cascaded chain, respectively. The first coupler couples an uplink and downlink switching signal generated by the baseband processing module to the first downlink analog radio frequency signal, couples a power supply signal generated by the power supply circuit to the first downlink analog radio frequency signal, performs interaction of a monitoring signal generated by the first monitoring circuit with the first-stage remote unit in the first remote cascaded chain, and performs analog radio frequency signal interaction with the first-stage remote unit in the first remote cascaded chain. The second coupler couples an uplink and downlink switching signal generated by the baseband processing module to the second downlink analog radio frequency signal, couples a power supply signal generated by the power supply circuit to the second downlink analog radio frequency signal, performs interaction of a monitoring signal generated by the first monitoring circuit with the first-stage remote unit in the second remote cascaded chain, and performs analog radio frequency signal interaction with the first-stage remote unit in the second remote cascaded chain.

Therefore, it is convenient for the remote units in the first remote cascaded chain and the second remote cascaded chain to know a transmission direction and a specific function of a signal in time.

In a possible design, each remote unit in the first remote cascaded chain acquires a third uplink analog radio frequency signal transmitted by the terminal device and a fourth uplink analog radio frequency signal transmitted by a following-stage remote unit in a same remote cascaded chain, and combines the third uplink analog radio frequency signal and the fourth uplink analog radio frequency signal to obtain the at least one first uplink analog radio frequency signal.

The first-stage remote unit in the first remote cascaded chain further transmits the at least one first uplink analog radio frequency signal to the digital-to-analog extended unit through a radio frequency cable.

The remaining remote units in the first remote cascaded chain except the first-stage remote unit each transmits the at least one first uplink analog radio frequency signal as the fourth uplink analog radio frequency signal to a previous-stage remote unit in the same remote cascaded chain through a radio frequency cable.

Each remote unit in the second remote cascaded chain acquires a fifth uplink analog radio frequency signal transmitted by the terminal device and a sixth uplink analog radio frequency signal transmitted by a following-stage remote unit in a same remote cascaded chain, and combines the fifth uplink analog radio frequency signal and the sixth uplink analog radio frequency signal to obtain the at least one second uplink analog radio frequency signal.

The first-stage remote unit in the second remote cascaded chain further transmits the at least one second uplink analog radio frequency signal to the digital-to-analog extended unit through a radio frequency cable.

The remaining remote units in the second remote cascaded chain except the first-stage remote unit each transmits the at least one second uplink analog radio frequency signal as the sixth uplink analog radio frequency signal to a previous-stage remote unit in the same remote cascaded chain through a radio frequency cable.

Therefore, each remote unit in the first remote cascaded chain and the second remote cascaded chain can complete its own functions and prepare for transmitting a signal to the terminal device and transmitting a signal to the digital-to-analog extended unit.

In a possible design, when the first remote cascaded chain or the second remote cascaded chain includes a plurality of remote units, the plurality of remote units in a same remote cascaded chain are in cascaded connection through a radio frequency cable.

Therefore, when an indoor space is large, through layout of a plurality of remote units, all indoor regions can be covered, which can ensure smoothness of an indoor mobile communication network.

In a possible design, when the distributed antenna system is a 2T2R distributed antenna system, the remote unit in the first remote cascaded chain includes one communication link module, and the remote unit in the second remote cascaded chain includes the one communication link module. When the distributed antenna system is a 4T4R distributed antenna system, the remote unit in the first remote cascaded chain includes two communication link modules, and the remote unit in the second remote cascaded chain includes the two communication link modules.

Therefore, the device cost of the communication link module in each remote unit is saved, and the construction cost of the distributed antenna system is reduced.

In a possible design, the communication link module includes: a third coupler and a radio frequency signal link processing circuit. The third coupler in the first-stage remote unit is connected to the digital-to-analog extended unit, and the third couplers in the remaining remote units except the first-stage remote unit are each connected to a following-stage remote unit in a same remote cascaded chain. The third coupler performs analog radio frequency signal interaction with the digital-to-analog extended unit and perform analog radio frequency signal interaction with the following-stage remote unit in the same remote cascaded chain.

Therefore, a possible design is provided for the communication link module, which realizes signal communication between the digital-to-analog extended unit and the terminal device.

In a possible design, the communication link module further includes: an uplink switching signal circuit, a power conversion circuit, and a second monitoring circuit. The third coupler is connected to the uplink switching signal circuit, the power conversion circuit, and the second monitoring circuit respectively. The third coupler acquires a power supply signal, acquire an uplink and downlink switching signal, and perform monitoring signal interaction with the digital-to-analog extended unit.

Therefore, another possible design is provided for the communication link module, so that the communication link module can know a transmission direction and a specific function of a signal in real time.

In a second aspect, the present disclosure provides a signal transmission method. The method is applied to a distributed antenna system, the distributed antenna system including: a digital-to-analog extended unit, a first remote cascaded chain corresponding to a first channel set, and a second remote cascaded chain corresponding to a second channel set. Remote units in the first remote cascaded chain are arranged adjacent to remote units in the second remote cascaded chain, a first-stage remote unit in the first remote cascaded chain is connected to the digital-to-analog extended unit through a radio frequency cable, and a first-stage remote unit in the second remote cascaded chain is connected to the digital-to-analog extended unit through a radio frequency cable.

The method includes: acquiring, by the digital-to-analog extended unit, a downlink digital radio frequency signal from a source unit; performing, by the digital-to-analog extended unit, a baseband processing operation and a digital-to-analog conversion operation on the downlink digital radio frequency signal, to obtain at least one first downlink analog radio frequency signal and at least one second downlink analog radio frequency signal; transmitting, by the digital-to-analog extended unit, the at least one first downlink analog radio frequency signal to the first remote cascaded chain, and transmit the at least one second downlink analog radio frequency signal to the second remote cascaded chain; performing, by the first remote cascaded chain, analog radio frequency signal interaction with a terminal device based on the at least one first downlink analog radio frequency signal; performing, by the second remote cascaded chain, analog radio frequency signal interaction with the terminal device based on the at least one second downlink analog radio frequency signal; transmitting, by the first remote cascaded chain, at least one first uplink analog radio frequency signal to the digital-to-analog extended unit; transmitting, by the second remote cascaded chain, at least one second uplink analog radio frequency signal to the digital-to-analog extended unit; performing, by the digital-to-analog extended unit, an analog-to-digital conversion operation and a baseband processing operation on the at least one first uplink analog radio frequency signal, to obtain an uplink digital radio frequency signal; and transmitting, by the digital-to-analog extended unit, the uplink digital radio frequency signal to the source unit.

In a possible design, the method further includes: acquiring, by the first-stage remote unit in the first remote cascaded chain, a third uplink analog radio frequency signal from the terminal device, and acquiring a fourth uplink analog radio frequency signal from a following-stage remote unit in a same remote cascaded chain; combining, by the first-stage remote unit in the first remote cascaded chain, the third uplink analog radio frequency signal and the fourth uplink analog radio frequency signal to obtain the at least one first uplink analog radio frequency signal; transmitting, by the first-stage remote unit in the first remote cascaded chain, the at least one first uplink analog radio frequency signal to the digital-to-analog extended unit; acquiring, by the first-stage remote unit in the second remote cascaded chain, a fifth uplink analog radio frequency signal from the terminal device, and acquiring a sixth uplink analog radio frequency signal from a following-stage remote unit in a same remote cascaded chain; combining, by the first-stage remote unit in the second remote cascaded chain, the fifth uplink analog radio frequency signal and the sixth uplink analog radio frequency signal to obtain the at least one second uplink analog radio frequency signal; and transmitting, by the first-stage remote unit in the second remote cascaded chain, the at least one second uplink analog radio frequency signal to the digital-to-analog extended unit.

In a possible design, for one remote unit of the remaining remote units in the first remote cascaded chain except the first-stage remote unit, the method further includes: acquiring, by the remote unit, the third uplink analog radio frequency signal from the terminal device, and acquiring the fourth uplink analog radio frequency signal from the following-stage remote unit in the same remote cascaded chain; combining, by the remote unit, the third uplink analog radio frequency signal and the fourth uplink analog radio frequency signal to obtain the at least one first uplink analog radio frequency signal; determining, by the remote unit, the at least one first uplink analog radio frequency signal as the fourth uplink analog radio frequency signal of the remote unit; and transmitting, by the remote unit, the fourth uplink analog radio frequency signal to a previous-stage remote unit in the same remote cascaded chain.

For one remote unit of the remaining remote units in the second remote cascaded chain except the first-stage remote unit, the method further includes: acquiring, by the remote unit, the fifth uplink analog radio frequency signal from the terminal device, and acquiring the sixth uplink analog radio frequency signal from the following-stage remote unit in the same remote cascaded chain; combining, by the remote unit, the fifth uplink analog radio frequency signal and the sixth uplink analog radio frequency signal to obtain the at least one second uplink analog radio frequency signal; determining, by the remote unit, the at least one second uplink analog radio frequency signal as the sixth uplink analog radio frequency signal of the remote unit; and transmitting, by the remote unit, the sixth uplink analog radio frequency signal to a previous-stage remote unit in the same remote cascaded chain.

Beneficial effects of the signal transmission method provided in the above second aspect and various possible designs of the second aspect may be obtained with reference to the beneficial effects brought by the above first aspect and various possible designs of the first aspect. Details are not described herein again.

REFERENCE SIGNS

200: distributed antenna system a; 201: digital-to-analog extended unit a; 202: remote unit a;
300: source unit;
100: distributed antenna system; 101: digital-to-analog extended unit; 102: first remote cascaded chain; 1021: remote unit in the first remote cascaded chain 102; 103:

second remote cascaded chain; 1031: remote unit in the second remote cascaded chain 103;

1011: optical transceiver module; 1012: baseband processing module; 1013: signal conversion module; 1014: radio frequency front-end module; 1015: first coupler; 1016: second coupler; 1017: first monitoring circuit; 1018: power supply circuit;

104: communication link module; 1041: third coupler; 1042: radio frequency signal link processing circuit; 1043: uplink switching signal circuit; 1044: power conversion circuit; 1045: second monitoring circuit.

DETAILED DESCRIPTION OF THE EMBODIMENTS

In the era of 5G, in order to cope with more and more mobile communication services, rigid requirements such as large broadband, high capacity, and low latency are put forward for an indoor mobile communication network. However, when a distributed antenna system a 200 shown in FIG. 1 needs to support multi-channel MIMO (i.e., more antennas), each remote unit a 202 in the distributed antenna system a 200 needs to be correspondingly provided with communication link modules, the number of which is the same as the number of channels. Therefore, when there are more channels, the cost of the system is higher, and the power consumption of the system is also higher, which is not conducive to the construction of the distributed antenna system.

Figure 2:
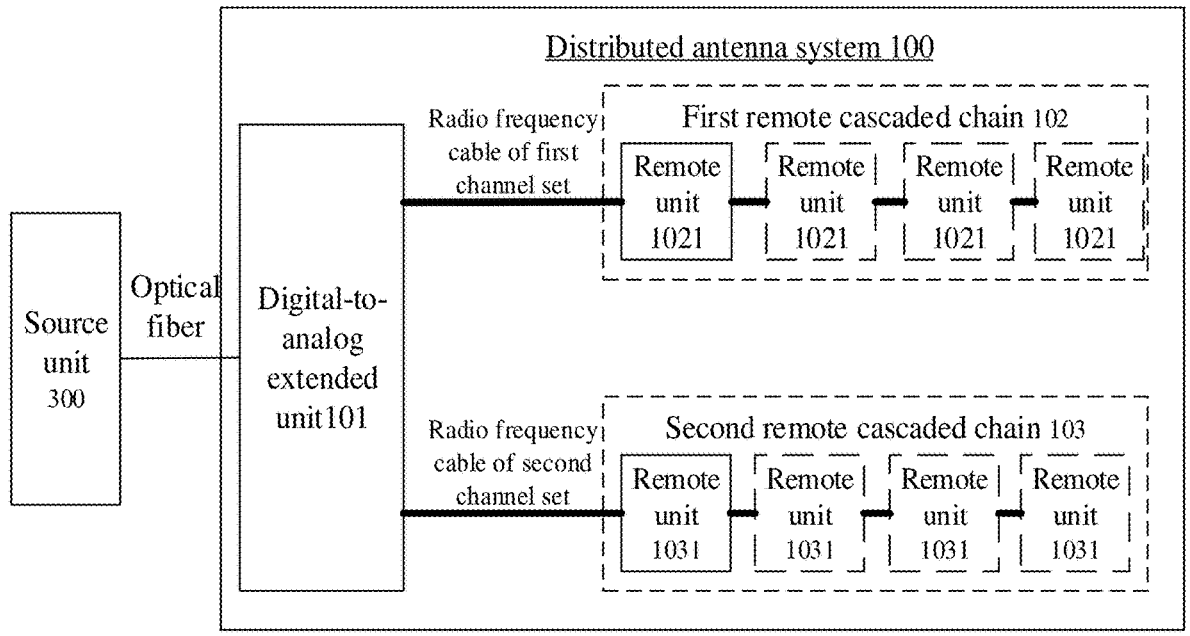
FIG. 2 is a schematic structural diagram of a distributed antenna system according to an embodiment of the present disclosure.

Referring to FIG. 2, FIG. 2 is a schematic structural diagram of a distributed antenna system according to an embodiment of the present disclosure. As shown in FIG. 2, a distributed antenna system 100 provided in the present disclosure may include: a digital-to-analog extended unit 101, a first remote cascaded chain 102 corresponding to a first channel set, and a second remote cascaded chain 103 corresponding to a second channel set.

The first remote cascaded chain 102 may include one or more remote units 1021, the remote units 1021 in the first remote cascaded chain 102 have a same structure, and the first channel set corresponds to the remote units 1021 in the first remote cascaded chain 102.

The one or more remote units 1021 are connected through a radio frequency cable to form the first remote cascaded chain 102, the remote unit 1021 at a head end of the first remote cascaded chain 102 is the first-stage remote unit 1021 in the first remote cascaded chain 102 (shown by a solid line in FIG. 2), and the first-stage remote unit 1021 in the first remote cascaded chain 102 is connected to the digital-to-analog extended unit 101 through a radio frequency cable (i.e., a radio frequency cable of the first channel set shown in FIG. 2).

The second remote cascaded chain 103 may include one or more remote units 1031, the remote units 1031 in the second remote cascaded chain 103 have a same structure, and the second channel set corresponds to the remote units 1031 in the second remote cascaded chain 103.

The one or more remote units 1031 are connected through a radio frequency cable to form the second remote cascaded chain 103, the remote unit 1031 at a head end of the second remote cascaded chain 103 is the first-stage remote unit 1031 in the second remote cascaded chain 103 (shown by a solid line in FIG. 2), and the first-stage remote unit 1031 in the second remote cascaded chain 103 is connected to the digital-to-analog extended unit 101 through a radio frequency cable (i.e., a radio frequency cable of the second channel set shown in FIG. 2).

The number of the remote units 1021 in the first remote cascaded chain 102 is the same as the number of the remote units 1031 in the second remote cascaded chain 103. Moreover, the remote units 1021 in the first remote cascaded chain 102 are arranged adjacent to the remote units 1031 in the second remote cascaded chain 103 (not shown in FIG. 2).

When the first remote cascaded chain 102 includes one remote unit 1021 and the second remote cascaded chain 103 includes one remote unit 1031, the two remote units (1021 and 1031) are arranged adjacent to each other. When the first remote cascaded chain 102 includes a plurality of remote units 1021 and the second remote cascaded chain 103 includes a plurality of remote units 1031, the remote units (1021 and 1031) in the different remote cascaded chains (102 and 103) are arranged adjacent to each other.

The digital-to-analog extended unit 101 may be connected to the first-stage remote unit 1021 in the first remote cascaded chain 102 and the first-stage remote unit 1031 in the second remote cascaded chain 103 through a bundled radio frequency cable. When the first remote cascaded chain 102 or the second remote cascaded chain 103 includes a plurality of remote units, the plurality of remote units in a same remote cascaded chain (102 or 103) are in cascaded connection through a radio frequency cable.

That is, when the first remote cascaded chain 102 includes a plurality of remote units 1021, one remote unit 1021 in the first remote cascaded chain 102 may be connected to adjacent remote units 1021 through a bundled radio frequency cable. When the second remote cascaded chain 103 includes a plurality of remote units 1031, one remote unit 1031 in the second remote cascaded chain 103 may be connected to adjacent remote units 1031 through a bundled radio frequency cable.

In addition, the remote unit 1021 in the first remote cascaded chain 102 and the remote unit 1031 in the second remote cascaded chain 103 may have a same structure, which helps to simplify the design of the system, or may have different structures, which provides another possible design for the system to facilitate a multi-channel MIMO requirement of the indoor mobile communication network.

The digital-to-analog extended unit 101 is configured to perform a baseband processing operation and a digital-to-analog conversion operation on a downlink digital radio frequency signal transmitted by a source unit 300 through an optical fiber, to obtain at least one first downlink analog radio frequency signal and at least one second downlink analog radio frequency signal.

Specific implementations of the downlink digital radio frequency signal and the source unit are not limited in the present disclosure. For example, the source unit 300 may be a base station, or may be part of a module of the base station, for example, a building base band unit, (BBU) or a radio remote unit (RRU). In addition, the digital-to-analog extended unit 101 may first perform the baseband processing operation and then perform the digital-to-analog conversion operation, or first perform the digital-to-analog conversion operation and then perform the baseband processing operation. A sequence in which the digital-to-analog extended unit 101 performs the baseband processing operation and the digital-to-analog conversion operation is not limited in the present disclosure.

The digital-to-analog extended unit 101 is configured to transmit the at least one first downlink analog radio frequency signal to the first remote cascaded chain 102 through a radio frequency cable. That is, the digital-to-analog extended unit 101 transmits the at least one first downlink analog radio frequency signal to the first-stage remote unit

1021 in the first remote cascaded chain 102. When the first remote cascaded chain 102 includes a plurality of remote units 1021, based on a connection relationship between the plurality of remote units 1021 in cascaded connection through a radio frequency cable, each remote unit 1021 in the first remote cascaded chain 102 except the first-stage remote unit 1021 may acquire at least one first downlink analog radio frequency signal from a previous-stage remote unit 1021.

Numbers of channels and signals of the at least one first downlink analog radio frequency signal acquired by the first-stage remote unit 1021 in the first remote cascaded chain 102 from the digital-to-analog extended unit 101 and the at least one first downlink analog radio frequency signal acquired by each remote unit 102 in the first remote cascaded chain 102 except the first-stage remote unit 1021 from the previous-stage remote unit 1021 are the same.

The digital-to-analog extended unit 101 is configured to transmit the at least one second downlink analog radio frequency signal to the second remote cascaded chain 103 through a radio frequency cable. That is, the digital-to-analog extended unit 101 transmits the at least one second downlink analog radio frequency signal to the first-stage remote unit 1031 in the second remote cascaded chain 103. When the second remote cascaded chain 103 includes a plurality of remote units 1031, based on a connection relationship between the plurality of remote units 1031 in cascaded connection through a radio frequency cable, each remote unit 1031 in the second remote cascaded chain 103 except the first-stage remote unit 1031 may acquire at least one second downlink analog radio frequency signal from a previous-stage remote unit 1031.

Numbers of channels and signals of the at least one second downlink analog radio frequency signal acquired by the first-stage remote unit 1031 in the second remote cascaded chain 103 from the digital-to-analog extended unit 101 and the at least one second downlink analog radio frequency signal acquired by each remote unit 103 in the second remote cascaded chain 1031 except the first-stage remote unit 1031 from the previous-stage remote unit 1031 are the same.

Specific implementations of the first downlink analog radio frequency signal and the second downlink analog radio frequency signal are not limited in the present disclosure. Generally, one of the first downlink analog radio frequency signal and the second downlink analog radio frequency signal is different from the remaining downlink analog radio frequency signals. In addition, a situation where the downlink analog radio frequency signal is the same as the remaining downlink analog radio frequency signals is not ruled out. Moreover, numbers of channels of the first downlink analog radio frequency signal and the second downlink analog radio frequency signal may be different or the same.

The first remote cascaded chain 102 is configured to perform analog radio frequency signal interaction with a terminal device based on the at least one first downlink analog radio frequency signal, and two adjacent remote units 1021 in the first remote cascaded chain 102 perform analog radio frequency signal interaction through a radio frequency cable, so that each remote unit 1021 in the first remote cascaded chain 102 except the first-stage remote unit 1021 can acquire the at least one first downlink analog radio frequency signal from the previous-stage remote unit 1021, which ensures that each remote unit 1021 in the first remote cascaded chain 102 can transmit a downlink analog radio frequency signal to the terminal device based on the at least one first downlink analog radio frequency signal.

The terminal device may include, but is not limited to, devices such as a mobile phone, a tablet computer, and a mobile player.

The second remote cascaded chain 103 is configured to perform analog radio frequency signal interaction with a terminal device based on the at least one second downlink analog radio frequency signal, and two adjacent remote units 1031 in the second remote cascaded chain 103 perform analog radio frequency signal interaction through a radio frequency cable, so that each remote unit 1031 in the second remote cascaded chain 103 except the first-stage remote unit 1031 can acquire the at least one second downlink analog radio frequency signal from the previous-stage remote unit 1031, which ensures that each remote unit 1031 in the second remote cascaded chain 103 can transmit a downlink analog radio frequency signal to the terminal device based on the at least one second downlink analog radio frequency signal.

One remote unit 1021 in the first remote cascaded chain 102 is further configured to acquire a third uplink analog radio frequency signal transmitted by the terminal device and a fourth uplink analog radio frequency signal transmitted by a following-stage remote unit 1021, and combine the third uplink analog radio frequency signal and the fourth uplink analog radio frequency signal to obtain the at least one first uplink analog radio frequency signal.

A final-stage remote unit 1021 in the first remote cascaded chain 102 (i.e., the remote unit 1021 at a tail end of the first remote cascaded chain 102) has no following-stage remote unit 1021. Therefore, the final-stage remote unit 1021 in the first remote cascaded chain 102 may acquire the third uplink analog radio frequency signal transmitted by the terminal device.

One remote unit 1031 in the second remote cascaded chain 103 is further configured to acquire a fifth uplink analog radio frequency signal transmitted by the terminal device and a sixth uplink analog radio frequency signal transmitted by a following-stage remote unit 1031, and combine the fifth uplink analog radio frequency signal and the sixth uplink analog radio frequency signal to obtain the at least one second uplink analog radio frequency signal.

A final-stage remote unit 1031 in the second remote cascaded chain 103 (i.e., the remote unit 1031 at a tail end of the second remote cascaded chain 103) has no following-stage remote unit 1031. Therefore, the final-stage remote unit 1031 in the second remote cascaded chain 103 may acquire the sixth uplink analog radio frequency signal transmitted by the terminal device. The first remote cascaded chain 102 is further configured to transmit the at least one first uplink analog radio frequency signal to the digital-to-analog extended unit 101 through a radio frequency cable. That is, the first-stage remote unit 1021 in the first remote cascaded chain 102 transmits the at least one first uplink analog radio frequency signal to the digital-to-analog extended unit 101.

It is to be noted that numbers of channels of the first downlink analog radio frequency signal transmitted by the digital-to-analog extended unit 101 to the first-stage remote unit 1021 in the first remote cascaded chain 102 and the first uplink analog radio frequency signal transmitted by the first-stage remote unit 1021 in the first remote cascaded chain 102 to the digital-to-analog extended unit 101 may be the same or different. For example, a downlink supports 4 streams, and an uplink supports 2 streams, or, a downlink supports 4 streams, and an uplink supports 4 streams.

The second remote cascaded chain 103 is further configured to transmit the at least one second uplink analog radio frequency signal to the digital-to-analog extended unit 101 through a radio frequency cable. That is, the first-stage remote unit 1031 in the second remote cascaded chain 103 transmits the at least one second uplink analog radio frequency signal to the digital-to-analog extended unit 101. It is to be noted that numbers of channels of the second downlink analog radio frequency signal transmitted by the digital-to-analog extended unit 101 to the first-stage remote unit 1031 in the second remote cascaded chain 103 and the second uplink analog radio frequency signal transmitted by the first-stage remote unit 1031 in the second remote cascaded chain 103 to the digital-to-analog extended unit 101 may be the same or different. For example, a downlink supports 4 streams, and an uplink supports 2 streams, or, a downlink supports 4 streams, and an uplink supports 4 streams.

Specific implementations of the first uplink analog radio frequency signal and the second uplink analog radio frequency signal are not limited in the present disclosure. Moreover, numbers of channels of the first uplink analog radio frequency signal and the second uplink analog radio frequency signal may be different or the same.

The digital-to-analog extended unit 101 is further configured to, after receiving the at least one first uplink analog radio frequency signal transmitted by the first-stage remote unit 1021 in the first remote cascaded chain 102 and the at least one second uplink analog radio frequency signal transmitted by the first-stage remote unit 1031 in the second remote cascaded chain 103, perform an analog-to-digital conversion operation and a baseband processing operation on the at least one first uplink analog radio frequency signal and the at least one second uplink analog radio frequency signal, to obtain an uplink digital radio frequency signal.

The digital-to-analog extended unit 101 may first perform the baseband processing operation and then perform the analog-to-digital conversion operation, or first perform the analog-to-digital conversion operation and then perform the baseband processing operation. A sequence in which the digital-to-analog extended unit 101 performs the baseband processing operation and the analog-to-digital conversion operation is not limited in the present disclosure.

The digital-to-analog extended unit 101 is further configured to transmit the uplink digital radio frequency signal to the source unit through an optical fiber, so that the source unit 300 can process the uplink digital radio frequency signal in time, and signal communication between the source unit 300 and the terminal device can be realized through the distributed antenna system of the present disclosure, which meets a multi-channel MIMO requirement of the indoor mobile communication network, and completes a mobile communication service indoors.

A specific implementation of the uplink digital radio frequency signal is not limited in the present disclosure.

Through the distributed antenna system provided in the present disclosure, a first remote cascaded chain corresponding to a first channel set and a second remote cascaded chain corresponding to a second channel set are obtained by means of division, such that when the distributed antenna system needs to support multi-channel MIMO, remote units in the first remote cascaded chain and remote units in the second remote cascaded chain only need to be configured with communication link modules, the number of which is less than the number of channels, and the multi-channel MIMO is jointly supported by using the remote units in the first remote cascaded chain and the remote units in the second remote cascaded chain, such that the multi-channel MIMO capability of an overlapping region can be realized, thereby reducing the device cost of the remote units and also reducing the construction cost of the system, and facilitating the improvement of the construction of the system.

In the present disclosure, the digital-to-analog extended unit 101 may be specifically implemented in a variety of manners.

A specific structure of the digital-to-analog extended unit 101 of the present disclosure is introduced below with reference to FIG. 3.

Figure 3:
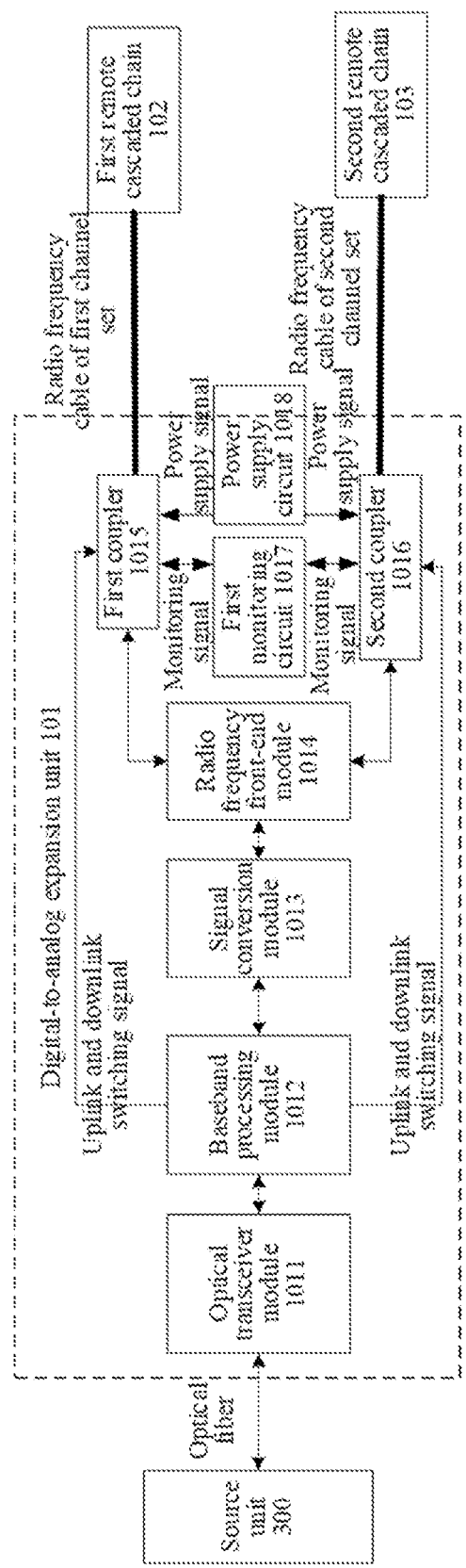
FIG. 3 is a schematic structural diagram of a digital-to-analog extended unit according to an embodiment of the present disclosure.

Referring to FIG. 3, FIG. 3 is a schematic structural diagram of a digital-to-analog extended unit according to an embodiment of the present disclosure. As shown in FIG. 3, the digital-to-analog extended unit 101 of the present disclosure may include: an optical transceiver module 1011, a baseband processing module 1012, a signal conversion module 1013, and a radio frequency front-end module 1014 successively connected.

The optical transceiver module 1011 is configured to perform optical signal interaction with the source unit.

The baseband processing module 1012 is configured to perform a baseband processing operation on a received signal.

The signal conversion module 1013 is configured to perform digital radio frequency signal interaction with the baseband processing module, and perform analog radio frequency signal interaction with the radio frequency front-end module 1014.

The radio frequency front-end module 1014 is configured to perform analog radio frequency signal processing with the first-stage remote unit in the first remote cascaded chain and the first-stage remote unit in the second remote cascaded chain.

Specific implementations of the optical transceiver module 1011, the baseband processing module 1012, the signal conversion module 1013, and the radio frequency front-end module 1014 are not limited in the present disclosure.

Still referring to FIG. 3, as shown in FIG. 3, the digital-to-analog extended unit 101 of the present disclosure may further include: a first monitoring circuit 1017, a power supply circuit 1018, a first coupler 1015, and a second coupler 1016.

The first coupler 1015 is connected to the baseband processing module 1012, the radio frequency front-end module 1014, the first monitoring circuit 1017, the power supply circuit 1018, and the first-stage remote unit 1021 in the first remote cascaded chain 102, respectively. The second coupler 1016 is connected to the baseband processing module 1012, the radio frequency front-end module 1014, the first monitoring circuit 1017, the power supply circuit 1018, and the first-stage remote unit 1031 in the second remote cascaded chain 103, respectively.

Specific implementations of the first monitoring circuit 1017, the power supply circuit 1018, the first coupler 1015, and the second coupler 1016 are not limited in the present disclosure.

The first coupler 1015 is configured to couple an uplink and downlink switching signal generated by the baseband processing module 1012 to the first downlink analog radio frequency signal, couple a power supply signal generated by the power supply circuit 1018 to the first downlink analog radio frequency signal, perform interaction of a monitoring signal generated by the first monitoring circuit 1017 with the first-stage remote unit 1021 in the first remote cascaded chain 102, and perform analog radio frequency signal interaction with the first-stage remote unit 1021 in the first remote cascaded chain 102.

The second coupler 1016 is configured to couple an uplink and downlink switching signal generated by the baseband processing module 1012 to the second downlink analog radio frequency signal, couple a power supply signal generated by the power supply circuit 1018 to the second downlink analog radio frequency signal, perform interaction of a monitoring signal generated by the first monitoring circuit 107 with the first-stage remote unit 1031 in the second remote cascaded chain 103, and perform analog radio frequency signal interaction with the first-stage remote unit 1031 in the second remote cascaded chain 103.

Specific implementations of the uplink and downlink switching signal, the power supply signal, and the monitoring signal not limited in the present disclosure.

It is to be noted that the first coupler 1015 or the second coupler 1016 may couple the uplink and downlink switching signal to one downlink analog radio frequency signal or couple the uplink and downlink switching signal to a plurality of downlink analog radio frequency signals, which is not limited in the present disclosure. The first coupler 1015 or the second coupler 1016 may couple the power supply signal to one downlink analog radio frequency signal or couple the power supply signal to a plurality of downlink analog radio frequency signals, which is not limited in the present disclosure. The first coupler 1015 or the second coupler 1016 may perform monitoring signal interaction in one downlink analog radio frequency signal or perform monitoring signal interaction in a plurality of downlink analog radio frequency signals, which is not limited in the present disclosure.

Generally, the first coupler 1015 or the second coupler 1016 may couple the uplink and downlink switching signal and the power supply signal to a same downlink analog radio frequency signal and detect the monitoring signal in the same downlink analog radio frequency signal.

In the present disclosure, for each remote unit 1021 in the first remote cascaded chain 102, the remote unit is configured to acquire a third uplink analog radio frequency signal transmitted by the terminal device and a fourth uplink analog radio frequency signal transmitted by a following-stage remote unit in a same remote cascaded chain, and combine the third uplink analog radio frequency signal and the fourth uplink analog radio frequency signal to obtain the at least one first uplink analog radio frequency signal.

For each remote unit 1031 in the second remote cascaded chain 103, the remote unit is configured to acquire a fifth uplink analog radio frequency signal transmitted by the terminal device and a sixth uplink analog radio frequency signal transmitted by a following-stage remote unit in a same remote cascaded chain, and combine the fifth uplink analog radio frequency signal and the sixth uplink analog radio frequency signal to obtain the at least one second uplink analog radio frequency signal.

The following-stage remote unit in the same remote cascaded chain belongs to a same remote cascaded chain as the above remote unit, and is adjacently connected to the above remote unit at a position of the above remote unit close to a tail end of the remote cascaded chain in the order of the remote cascaded chain from the head end to the tail end.

For the first-stage remote unit 1021 in the first remote cascaded chain 102, the first-stage remote unit is configured to transmit the at least one first uplink analog radio frequency signal to the digital-to-analog extended unit through a radio frequency cable.

For the remaining remote units 1021 in the first remote cascaded chain 102 except the first-stage remote unit 1021, each of the remaining remote units is configured to transmit the at least one first uplink analog radio frequency signal as the third uplink analog radio frequency signal to a previous-stage remote unit in a same remote cascaded chain through a radio frequency cable.

The first uplink analog radio frequency signal/the fourth uplink analog radio frequency signal or the second uplink analog radio frequency signal/the sixth uplink analog radio frequency signal of the remote unit is the at least one first uplink analog radio frequency signal obtained by combining the third uplink analog radio frequency signal acquired by the remote unit from the terminal device and the fourth uplink analog radio frequency signal acquired from a following-stage remote unit of the remote unit in a same remote cascaded chain.

For the first-stage remote unit 1031 in the second remote cascaded chain 103, the first-stage remote unit is configured to transmit the at least one second uplink analog radio frequency signal to the digital-to-analog extended unit through a radio frequency cable.

For the remaining remote units 1031 in the second remote cascaded chain 103 except the first-stage remote unit 1031, each of the remaining remote units is configured to transmit the at least one second uplink analog radio frequency signal as the sixth uplink analog radio frequency signal to a previous-stage remote unit in the same remote cascaded chain through a radio frequency cable.

The previous-stage remote unit in the same remote cascaded chain belongs to a same remote cascaded chain as the above remote unit, and is adjacently connected to the above remote unit at a position of the above remote unit close to a tail end of the remote cascaded chain in the order of the remote cascaded chain from the head end to the tail end.

The second uplink analog radio frequency signal/the sixth uplink analog radio frequency signal of the remote unit is the at least one second uplink analog radio frequency signal obtained by combining the fifth uplink analog radio frequency signal acquired by the remote unit from the terminal device and the sixth uplink analog radio frequency signal acquired from a following-stage remote unit of the remote unit in a same remote cascaded chain.

In the present disclosure, one remote unit 1021 in the first remote cascaded chain 102 or one remote unit 1031 in the second remote cascaded chain 103 may include at least one communication link module 104. The communication link module 104 is a core component of the remote unit, is configured to receive a signal from a following-stage remote unit or the digital-to-analog extended unit 101 and transmit a signal to a previous-stage remote unit or the digital-to-analog extended unit 101, and is further configured to transmit a signal to the terminal device or receive a signal from the terminal device.

A specific structure of the distributed antenna system 100 of the present disclosure which is a 2T2R distributed antenna system is introduced below with reference to FIG. 4. The 2T2R distributed antenna system meets a communication requirement of two-channel MIMO.

Figure 4:
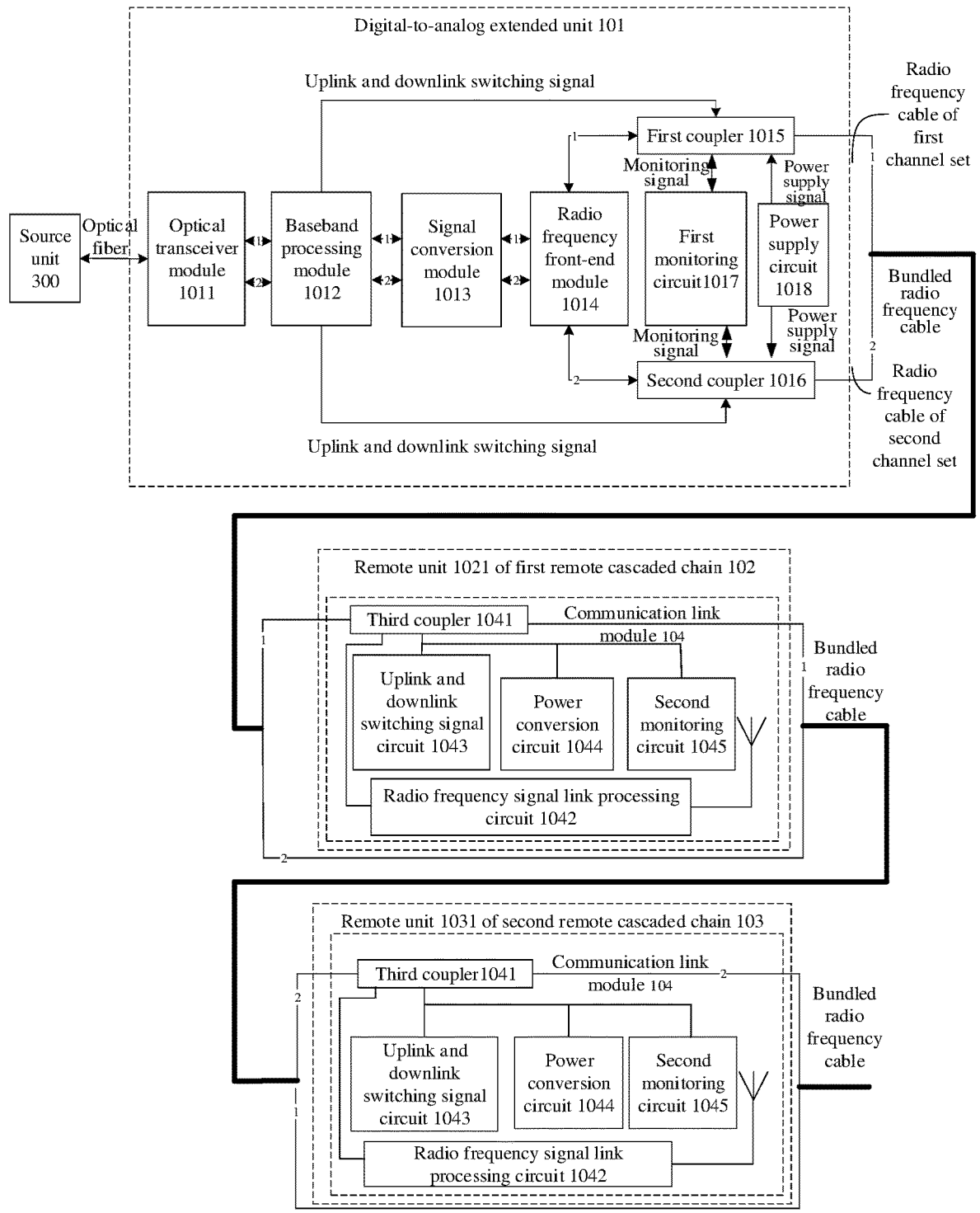
FIG. 4 is a schematic structural diagram of a distributed antenna system according to an embodiment of the present disclosure.

Referring to FIG. 4, FIG. 4 is a schematic structural diagram of a distributed antenna system according to an embodiment of the present disclosure. As shown in FIG. 4, for the 2T2R distributed antenna system, the digital-to-analog extended unit 101 is configured to perform a baseband processing operation and a digital-to-analog conversion operation on a two-channel downlink digital radio frequency signal transmitted by the source unit 300 through an optical fiber, to obtain two downlink analog radio frequency signals (i.e., a two-channel downlink analog radio frequency signal). The digital-to-analog extended unit 101 transmits one first downlink analog radio frequency signal (i.e., a channel-1 downlink analog radio frequency signal) to a radio frequency cable 1 of the first channel set, then this signal is transmitted to the first remote cascaded chain through the radio frequency cable 1 of the first channel set. The digital-to analog extended unit 10 also transmits one second downlink analog radio frequency signal (i.e., a channel-2 downlink analog radio frequency signal) to a radio frequency cable 2 of the second channel set, then this signal is transmitted to the second remote cascaded chain through the radio frequency cable 2 of the second channel set.

In addition, the first coupler 1015 in the digital-to-analog extended unit 101 couples an uplink and downlink switching signal generated by the baseband processing module 1012 to the first downlink analog radio frequency signal transmitted by the radio frequency cable 1 of the first channel set, couples a power supply signal to the first downlink analog radio frequency signal transmitted by the radio frequency cable 1 of the first channel set, performs monitoring signal interaction with the remote unit 1021 in the first remote cascaded chain 102 connected to the radio frequency cable 1 of the first channel set, and performs analog radio frequency signal interaction with the remote unit 1021 in the first remote cascaded chain 102 connected to the radio frequency cable 1 of the first channel set.

In addition, the second coupler 1016 in the digital-to-analog extended unit 101 couples an uplink and downlink switching signal generated by the baseband processing module 1012 to the second downlink analog radio frequency signal transmitted by the radio frequency cable 2 of the second channel set, couples a power supply signal to the second downlink analog radio frequency signal transmitted by the radio frequency cable 2 of the second channel set, performs monitoring signal interaction with the remote unit 1031 in the second remote cascaded chain 103 connected to the radio frequency cable 2 of the second channel set, and performs analog radio frequency signal interaction with the remote unit 1031 in the second remote cascaded chain 103 connected to the radio frequency cable 2 of the second channel set.

The remote unit 1021 in the first remote cascaded chain 102 includes a communication link module 104, and supports 1T1R maximally. The communication link module 104 in the remote unit 1021 acquires one first downlink analog radio frequency signal in the radio frequency cable 1 of the first channel set, and transmits a downlink radio frequency signal to the terminal device based on the first downlink analog radio frequency signal.

The remote unit 1031 in the second remote cascaded chain 103 includes a communication link module 104, and supports 1T1R maximally. The remote unit 1031 acquires one second downlink analog radio frequency signal in the radio frequency cable 2 of the second channel set, and transmits a downlink radio frequency signal to the terminal device based on the second downlink analog radio frequency signal.

In addition, for any one of the remote units 1021 in the first remote cascaded chain 102, the remote unit acquires a third uplink analog radio frequency signal from the terminal device and a fourth uplink analog radio frequency signal transmitted by a following-stage remote unit in a same remote cascaded chain. The remote unit combines the third uplink analog radio frequency signal and the fourth uplink analog radio frequency signal to obtain one first uplink analog radio frequency signal of the remote unit. The remote unit transmits the first uplink analog radio frequency signal as the fourth uplink analog radio frequency signal to a previous-stage remote unit in the same remote cascaded chain, or the remote unit transmits the first uplink analog radio frequency signal to the digital-to-analog extended unit.

In addition, for any one of the remote units 1031 in the second remote cascaded chain 103, the remote unit acquires a fifth uplink analog radio frequency signal from the terminal device and a sixth uplink analog radio frequency signal transmitted by a following-stage remote unit in a same remote cascaded chain. The remote unit combines the fifth uplink analog radio frequency signal and the sixth uplink analog radio frequency signal to obtain one second uplink analog radio frequency signal of the remote unit. The remote unit transmits the second uplink analog radio frequency signal as the sixth uplink analog radio frequency signal to a previous-stage remote unit in the same remote cascaded chain, or the remote unit transmits the second uplink analog radio frequency signal to the digital-to-analog extended unit.

Based on this, 1T1R remote units arranged adjacent to each other in the first channel set and the second channel set can respectively receive one signal (the channel-1 downlink analog radio frequency signal or the channel-2 downlink analog radio frequency signal) from the digital-to-analog extended unit, and can respectively transmit one signal (one first uplink analog radio frequency signal or one second uplink analog radio frequency signal) to the digital-to-analog extended unit. In an overlapping coverage region of the two 1T1R remote units, 2T2R signal transmission can be formed to meet the communication requirement of two-channel MIMO.

Figure 1:
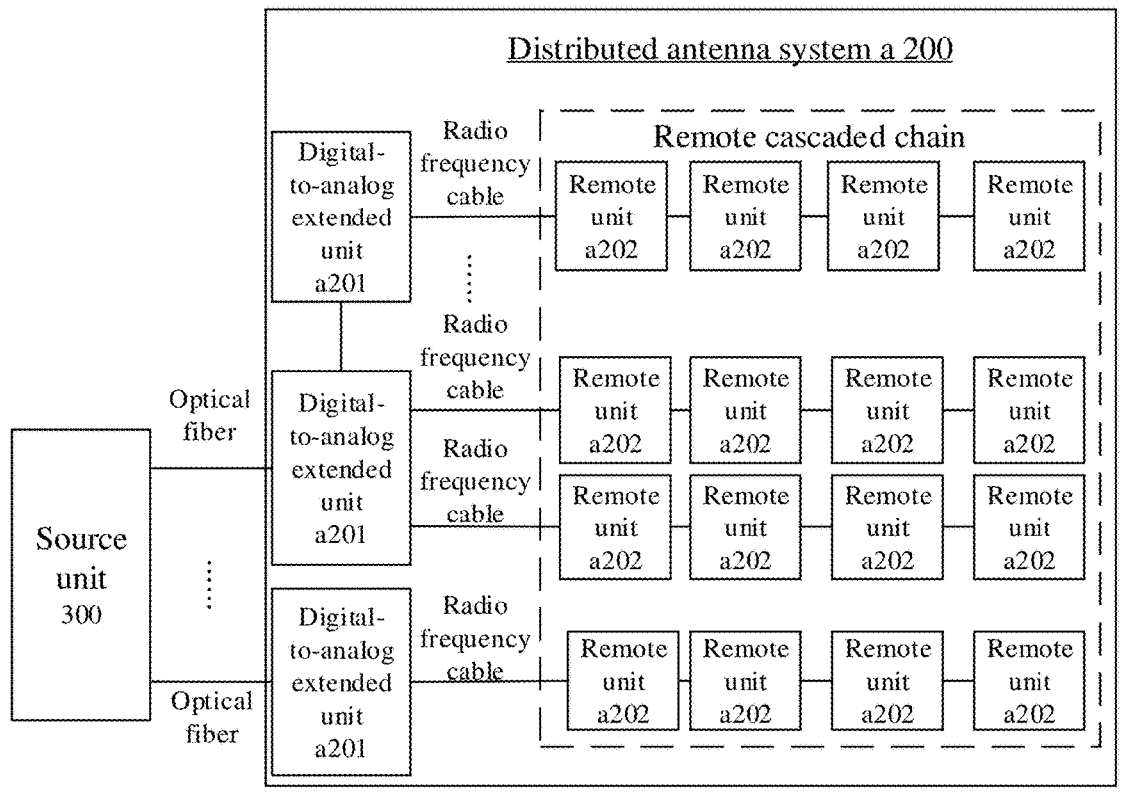
FIG. 1 is a schematic structural diagram of a distributed antenna system a that can meet a requirement of an indoor mobile communication network according to the prior art.

Based on the above, in the distributed antenna system 100 of the present disclosure, the remote unit 1021 in the first remote cascaded chain 102 includes one communication link module 104, and the remote unit 1031 in the second remote cascaded chain 103 includes one communication link module 104. However, when the distributed antenna system a 200 in FIG. 1 is a 2T2R distributed antenna system, each remote unit a 202 requires two communication link modules.

A specific structure of the distributed antenna system 100 of the present disclosure which is a 4T4R distributed antenna system is introduced below with reference to FIG. 5. The 4T4R distributed antenna system meets a communication requirement of four-channel MIMO.

Figure 5:
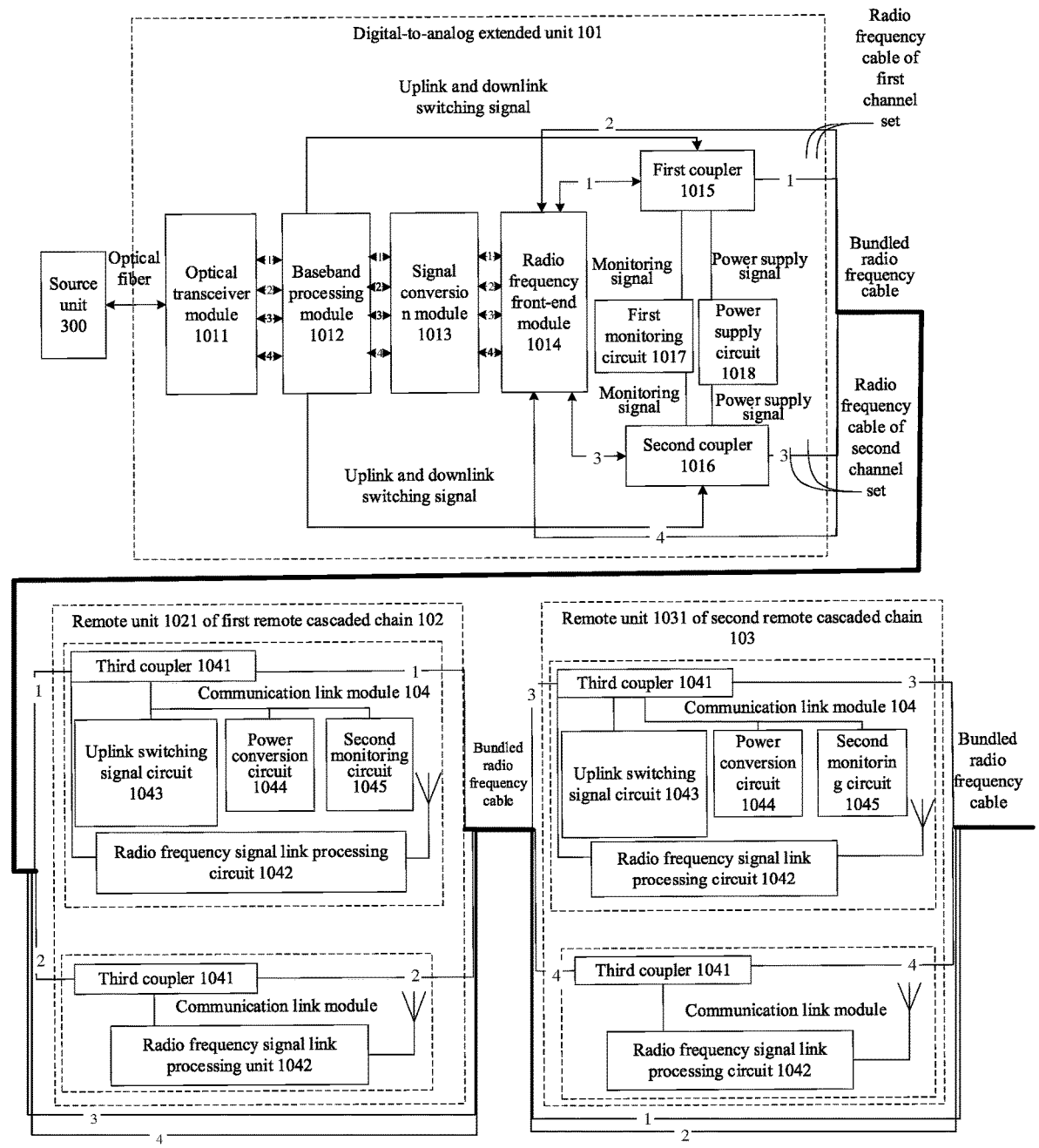
FIG. 5 is a schematic structural diagram of a distributed antenna system according to an embodiment of the present disclosure.

Referring to FIG. 5, FIG. 5 is a schematic structural diagram of a distributed antenna system according to an embodiment of the present disclosure. As shown in FIG. 5, for the 4T4R distributed antenna system, the digital-to-analog extended unit 101 performs a baseband processing operation and a digital-to-analog conversion operation on a four-channel downlink digital radio frequency signal transmitted by the source unit 300 through an optical fiber, to obtain four downlink analog radio frequency signals (i.e., a four-channel downlink analog radio frequency signal). The digital-to-analog extended unit 101 transmits two first downlink analog radio frequency signals (i.e., a channel-1 downlink analog radio frequency signal and a channel-2 downlink analog radio frequency signal) to a radio frequency cable 1 and a radio frequency cable 2 of the first channel set, which are then transmitted to the first remote cascaded chain through the radio frequency cable 1 and the radio frequency cable 2 of the first channel set. The digital-to-analog extended unit 101 also transmits the other two second downlink analog radio frequency signals (i.e., a channel-3 downlink analog radio frequency signal and a channel-4 downlink analog radio frequency signal) to a radio frequency cable 3 and a radio frequency cable 4 of the second channel set, which are then transmitted to the second remote cascaded chain through the radio frequency cable 3 and the radio frequency cable 4 of the second channel set.

In addition, the first coupler 1015 in the digital-to-analog extended unit 101 couples an uplink and downlink switching signal generated by the baseband processing module 1012 to one first downlink analog radio frequency signal (i.e., the channel-1 downlink analog radio frequency signal) transmitted by the radio frequency cable 1 of the first channel set, couples a power supply signal to the first downlink analog radio frequency signal (i.e., the channel-1 downlink analog radio frequency signal) transmitted by the radio frequency cable 1 of the first channel set, performs monitoring signal interaction with the remote unit 1021 in the first remote cascaded chain 102 connected to the radio frequency cable 1 of the first channel set, and performs analog radio frequency signal interaction with the remote unit 1021 in the first remote cascaded chain 102 connected to the radio frequency cable 1 of the first channel set.

In addition, the second coupler 1016 in the digital-to-analog extended unit 101 couples an uplink and downlink switching signal generated by the baseband processing module 1012 to one second downlink analog radio frequency signal (i.e., the channel-3 downlink analog radio frequency signal) transmitted by the radio frequency cable 3 of the second channel set, couples a power supply signal to the second downlink analog radio frequency signal (i.e., the channel-3 downlink analog radio frequency signal) transmitted by the radio frequency cable 3 of the second channel set, performs monitoring signal interaction with the remote unit 1031 in the second remote cascaded chain 103 connected to the radio frequency cable 3 of the second channel set, and performs analog radio frequency signal interaction with the remote unit 1031 in the second remote cascaded chain 103 connected to the radio frequency cable 3 of the second channel set.

The remote unit 1021 in the first remote cascaded chain 102 includes two communication link modules 104, and supports 2T2R maximally. One communication link module 104 in the remote unit 1021 acquires one first downlink analog radio frequency signal in the radio frequency cable 1 of the first channel set, and transmits a downlink radio frequency signal to the terminal device based on the first downlink analog radio frequency signal. The other communication link module 104 acquires one first downlink analog radio frequency signal in the radio frequency cable 2 of the first channel set, and transmits a downlink radio frequency signal to the terminal device based on the first downlink analog radio frequency signal.

The remote unit 1031 in the second remote cascaded chain 103 includes two communication link modules 104, and supports 2T2R maximally. One communication link module 104 in the remote unit 1031 acquires one second downlink analog radio frequency signal in the radio frequency cable 3 of the second channel set, and transmits a downlink radio frequency signal to the terminal device based on the second downlink analog radio frequency signal. The other communication link module 104 acquires one second downlink analog radio frequency signal in the radio frequency cable 4 of the second channel set, and transmits a downlink radio frequency signal to the terminal device based on the second downlink analog radio frequency signal.

In addition, for any one of the remote units 1021 in the first remote cascaded chain 102, the remote unit acquires a third uplink analog radio frequency signal from the terminal device and a fourth uplink analog radio frequency signal transmitted by a following-stage remote unit in a same remote cascaded chain. The remote unit combines the third uplink analog radio frequency signal and the fourth uplink analog radio frequency signal to obtain two first uplink analog radio frequency signals of the remote unit. The remote unit transmits the two first uplink analog radio frequency signals as two fourth analog radio frequency signals to a previous-stage remote unit in the same remote cascaded chain, or the remote unit transmits the two first uplink analog radio frequency signals to the digital-to-analog extended unit.

In addition, for any one of the remote units 1031 in the second remote cascaded chain 103, the remote unit acquires a fifth uplink analog radio frequency signal from the terminal device and a sixth uplink analog radio frequency signal transmitted by a following-stage remote unit in a same remote cascaded chain. The remote unit combines the fifth uplink analog radio frequency signal and the sixth uplink analog radio frequency signal to obtain two second uplink analog radio frequency signals of the remote unit. The remote unit transmits the two second uplink analog radio frequency signals as two sixth analog radio frequency signals to a previous-stage remote unit in the same remote cascaded chain, or the remote unit transmits the two second uplink analog radio frequency signals to the digital-to-analog extended unit.

Based on this, 2T2R remote units arranged adjacent to each other in the first channel set and the second channel set respectively receive two signals (the channel-1 downlink analog radio frequency signal and the channel-2 downlink analog radio frequency signal, or the channel-3 downlink analog radio frequency signal and the channel-4 downlink analog radio frequency signal) from the digital-to-analog extended unit, and can respectively transmit two signals (two first uplink analog radio frequency signals or two second uplink analog radio frequency signals) to the digital-to-analog extended unit. In an overlapping coverage region of the two 2T2R remote units, 4T4R signal transmission can be formed to meet the communication requirement of four-channel MIMO.

Based on the above, in the distributed antenna system 100 of the present disclosure, the remote unit 1021 in the first remote cascaded chain 102 includes two communication link modules 104, and the remote unit 1031 in the second remote cascaded chain 103 includes two communication link modules 104. However, when the distributed antenna system a 200 in FIG. 1 is a 4T4R distributed antenna system, each remote unit a 202 requires four communication link modules.

Based on the description content of FIG. 4 and FIG. 5, in the distributed antenna system 100 of the present disclosure, the remote unit 1021 in the first remote cascaded chain 102 and the remote unit 1031 in the second remote cascaded chain 103 do not need to be configured with communication link modules 104, the number of which is the same as the number of channels, and only need to be configured with communication link modules 104, the number of which is less than the number of channels, and the multi-channel MIMO can be jointly supported by using the remote unit 1021 in the first remote cascaded chain 102 and the remote unit 1031 in the second remote cascaded chain 103, such that the multi-channel MIMO capability of an overlapping region between the remote unit 1021 in the first remote cascaded chain 102 and the remote unit 1031 in the second remote cascaded chain 103 can be realized, thereby reducing the device cost and the construction cost of the system.

It is to be noted that the distributed antenna system 100 of the present disclosure may alternatively be expanded to an 8T8R distributed antenna system according to an actual requirement, so as to meet a communication requirement of multi-channel MIMO such as eight-channel MIMO.

A specific implementation of the communication link module 104 is not limited in the present disclosure. In some embodiments, as shown in FIG. 4 or FIG. 5, the communication link module 104 of the present disclosure may include: a third coupler 1041 and a radio frequency signal link processing circuit 1042 that are connected.

The third coupler 1041 in the first-stage remote unit is connected to the digital-to-analog extended unit 101, and the third couplers 1041 in the remaining remote units except the first-stage remote unit are each connected to a following-stage remote unit in a same remote cascaded chain.

The third coupler 1041 is configured to perform analog radio frequency signal interaction with the digital-to-analog extended unit 101 and perform analog radio frequency signal interaction with the following-stage remote unit in the same remote cascaded chain.

Specific implementations of the third coupler 1041 and the radio frequency signal link processing circuit 1042 are not limited in the present disclosure.

Still referring to FIG. 4 or FIG. 5, as shown in FIG. 4 or FIG. 5, the communication link module of the present disclosure may further include: an uplink switching signal circuit 1043, a power supply conversion circuit 1044, and a second monitoring circuit 1045.

The third coupler 1041 is connected to the uplink switching signal circuit 1043, the power conversion circuit 1044, and the second monitoring circuit 1045, respectively.

The third coupler 1041 is configured to acquire a power supply signal, acquire an uplink and downlink switching signal, and perform monitoring signal interaction with the digital-to-analog extended unit.

Specific implementations of the uplink switching signal circuit 1043, the power conversion circuit 1044, and the second monitoring circuit 1045 are not limited in the present disclosure.

It is to be noted that when the remote unit 1021 in the first remote cascaded chain 102 and the remote unit 1031 in the second remote cascaded chain 103 each include a plurality of communication link modules 104, one of the communication link modules 104 is provided with the uplink switching signal circuit 1043, the power conversion circuit 1044, and the second monitoring circuit 1045.

Exemplarily, the present disclosure further provides a signal transmission method. The signal transmission method is applied to the distributed antenna system as referred to in the embodiments in FIG. 2 to FIG. 5 above.

Figure 6:
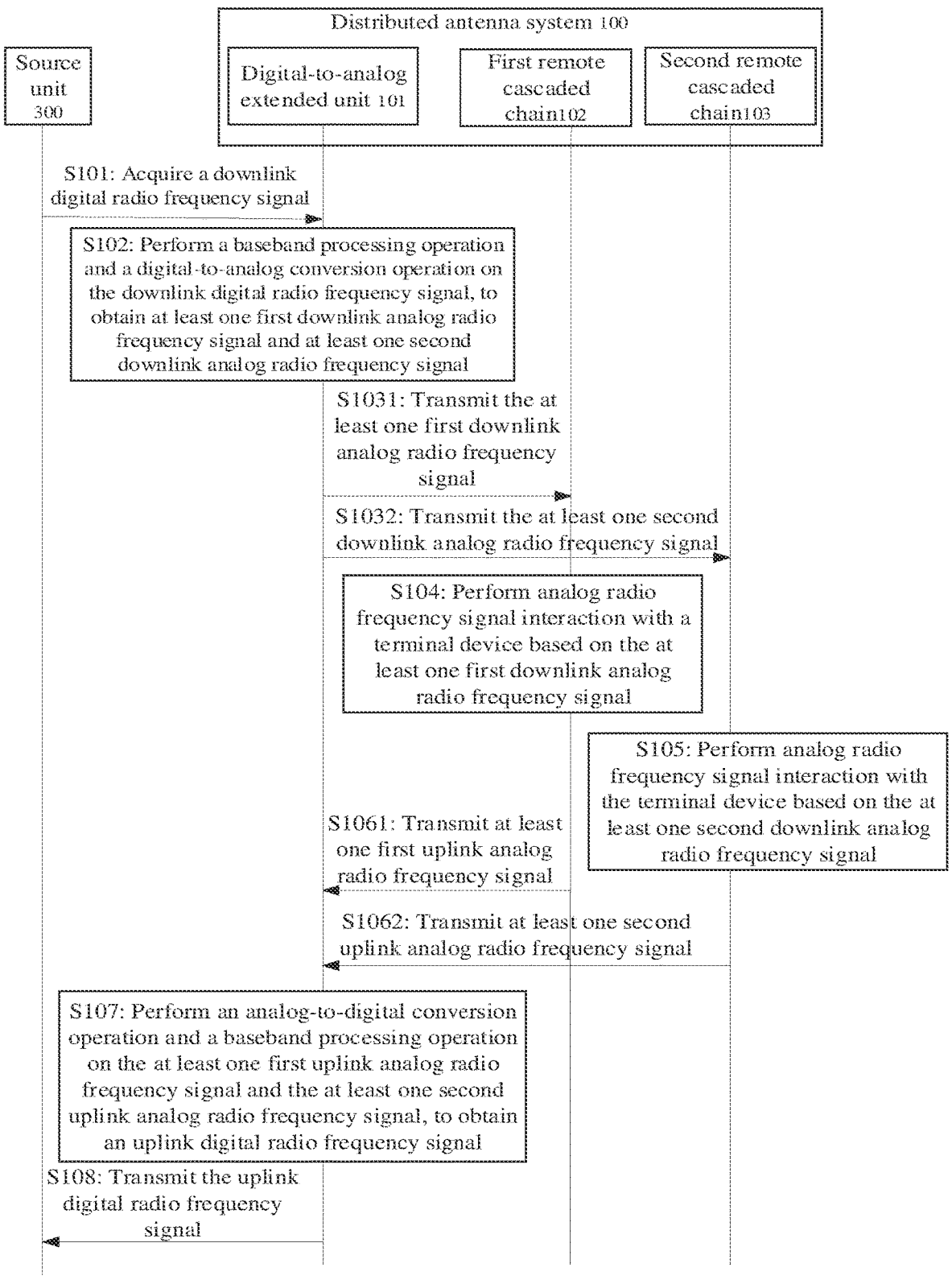
FIG. 6 is a signaling interaction diagram of a signal transmission method according to an embodiment of the present disclosure.

Referring to FIG. 6, FIG. 6 is a signaling interaction diagram of a signal transmission method according to an embodiment of the present disclosure. As shown in FIG. 6, when performed by the digital-to-analog extended unit 101, the first remote cascaded chain 102, and the second remote cascaded chain 103 in the distributed antenna system 100 as referred to in the embodiments in FIG. 2 to FIG. 5 above, the signal transmission method provided in the present disclosure may include the following steps.

In S101, the digital-to-analog extended unit acquires a downlink digital radio frequency signal from a source unit.

In S102, the digital-to-analog extended unit performs a baseband processing operation and a digital-to-analog conversion operation on the downlink digital radio frequency signal, to obtain at least one first downlink analog radio frequency signal and at least one second downlink analog radio frequency signal.

In S1031, the digital-to-analog extended unit transmits the at least one first downlink analog radio frequency signal to the first remote cascaded chain.

In S1032, the digital-to-analog extended unit transmits the at least one second downlink analog radio frequency signal to the second remote cascaded chain.

An execution order of steps S1031 and S1032 is not limited in the present disclosure.

In S104, the first remote cascaded chain performs analog radio frequency signal interaction with a terminal device based on the at least one first downlink analog radio frequency signal.

In S105, the second remote cascaded chain performs analog radio frequency signal interaction with the terminal device based on the at least one second downlink analog radio frequency signal.

In S1061, the first remote cascaded chain transmits at least one first uplink analog radio frequency signal to the digital-to-analog extended unit.

In S1062, the second remote cascaded chain transmits at least one second uplink analog radio frequency signal to the digital-to-analog extended unit.

An execution order of steps S1061 and S1062 is not limited in the present disclosure.

In S107, the digital-to-analog extended unit performs an analog-to-digital conversion operation and a baseband processing operation on the at least one first uplink analog radio frequency signal and the at least one second uplink analog radio frequency signal, to obtain an uplink digital radio frequency signal.

In S108, the digital-to-analog extended unit transmits the uplink digital radio frequency signal to the source unit.

The signal transmission method provided in the present disclosure can implement the above embodiments, and a specific implementation principle and a technical effect thereof may be obtained with reference to the above embodiments. Details are not described herein again in the present disclosure.

In step S1061, the at least one first uplink analog radio frequency signal may be obtained in a variety of implementation manners. In a feasible implementation, the first-stage remote unit in the first remote cascaded chain acquires a third uplink analog radio frequency signal from the terminal device, and acquires a fourth uplink analog radio frequency signal from a following-stage remote unit in a same remote cascaded chain. The first-stage remote unit in the first remote cascaded chain combines the third uplink analog radio frequency signal and the fourth uplink analog radio frequency signal to obtain the at least one first uplink analog radio frequency signal.

The first-stage remote unit in the first remote cascaded chain transmits the at least one first uplink analog radio frequency signal to the digital-to-analog extended unit based on a connection relationship between the remote units in the first remote cascaded chain.

In addition, for each remote unit in the remaining remote units in the first remote cascaded chain except the first-stage remote unit, the remote unit acquires a third uplink analog radio frequency signal from the terminal device, and acquires a fourth uplink analog radio frequency signal from a following-stage remote unit in a same remote cascaded chain. The remote unit combines the third uplink analog radio frequency signal and the fourth uplink analog radio frequency signal to obtain the at least one first uplink analog radio frequency signal. The remote unit determines the at least one first uplink analog radio frequency signal as the fourth uplink analog radio frequency signal of the remote unit. The remote unit transmits the fourth uplink analog radio frequency signal to a previous-stage remote unit in the same remote cascaded chain.

In step S1062, the at least one second uplink analog radio frequency signal may be obtained in a variety of implementation manners. In a feasible implementation, the first-stage remote unit in the second remote cascaded chain acquires a fifth uplink analog radio frequency signal from the terminal device, and acquires a sixth uplink analog radio frequency signal from a following-stage remote unit in a same remote cascaded chain. The first-stage remote unit in the second remote cascaded chain combines the fifth uplink analog radio frequency signal and the sixth uplink analog radio frequency signal to obtain the at least one second uplink analog radio frequency signal.

The first-stage remote unit in the second remote cascaded chain transmits the at least one second uplink analog radio frequency signal to the digital-to-analog extended unit based on a connection relationship between the remote units in the second remote cascaded chain.

In addition, for each remote unit in the remaining remote units in the second remote cascaded chain except the first-stage remote unit, the remote unit acquires a fifth uplink analog radio frequency signal from the terminal device, and acquires a sixth uplink analog radio frequency signal from a following-stage remote unit in a same remote cascaded chain. The remote unit combines the fifth uplink analog radio frequency signal and the sixth uplink analog radio frequency signal to obtain the at least one second uplink analog radio frequency signal. The remote unit determines the at least one second uplink analog radio frequency signal as the sixth uplink analog radio frequency signal of the remote unit. The remote unit transmits the sixth uplink analog radio frequency signal to a previous-stage remote unit in the same remote cascaded chain.

INDUSTRIAL APPLICABILITY

Through the distributed antenna system provided in the present disclosure, when the distributed antenna system needs to support multi-channel MIMO, the multi-channel MIMO is jointly supported by using the remote units in the first remote cascaded chain and the remote units in the second remote cascaded chain, such that the multi-channel MIMO capability of an overlapping region can be realized, thereby reducing the device cost of the remote units and also reducing the construction cost of the system, and having strong industrial applicability.

What is claimed is:

1. A distributed antenna system, comprising:
a digital-to-analog extended unit;
a first remote cascaded chain corresponding to a first channel set; and
a second remote cascaded chain corresponding to a second channel set;
each remote unit in the first remote cascaded chain and the second remote cascaded chain is provided with communication link modules, a number of the communication link modules in each remote unit being less than a number of channels, the remote units in the first remote cascaded chain being arranged adjacent to the remote units in the second remote cascaded chain, a first-stage remote unit in the first remote cascaded chain being connected to the digital-to-analog extended unit through a radio frequency cable, and a first-stage remote unit in the second remote cascaded chain being connected to the digital-to-analog extended unit through a radio frequency cable; wherein the digital-to-analog extended unit performs a baseband processing operation and a digital-to-analog conversion operation on a downlink digital radio frequency signal transmitted by a source unit through an optical fiber, to obtain at least one first downlink analog radio frequency signal and at least one second downlink analog radio frequency signal;

the first remote cascaded chain performs analog radio frequency signal interaction with a terminal device based on the at least one first downlink analog radio frequency signal, and two adjacent remote units in the first remote cascaded chain perform analog radio frequency signal interaction through a radio frequency cable;

the second remote cascaded chain performs analog radio frequency signal interaction with the terminal device based on the at least one second downlink analog radio frequency signal, and two adjacent remote units in the second remote cascaded chain performs analog radio frequency signal interaction through a radio frequency cable; and the digital-to-analog extended unit further performs an analog-to-digital conversion operation and a baseband processing operation on at least one first uplink analog radio frequency signal transmitted from the first remote cascaded chain and at least one second uplink analog radio frequency signal transmitted from the second remote cascaded chain, to obtain an uplink digital radio frequency signal, and transmits the uplink digital radio frequency signal to the source unit through an optical fiber.

2. The distributed antenna system according to claim 1, wherein the digital-to-analog extended unit comprises: an optical transceiver module, a baseband processing module, a signal conversion module, and a radio frequency front-end module successively connected, the radio frequency front-end module being respectively connected to the first-stage remote unit in the first remote cascaded chain and the first-stage remote unit in the second remote cascaded chain; wherein the optical transceiver module performs optical signal interaction with the source unit;
the baseband processing module performs a baseband processing operation on a received signal;
the signal conversion module performs digital radio frequency signal interaction with the baseband processing module, and performs analog radio frequency signal interaction with the radio frequency front-end module; and
the radio frequency front-end module performs analog radio frequency signal processing with the first-stage remote unit in the first remote cascaded chain and the first-stage remote unit in the second remote cascaded chain.

3. The distributed antenna system according to claim 2, wherein the digital-to-analog extended unit further comprises: a first monitoring circuit, a power supply circuit, a first coupler, and a second coupler;
the first coupler being connected to the baseband processing module, the radio frequency front-end module, the first monitoring circuit, the power supply circuit, and the first-stage remote unit in the first remote cascaded chain respectively; the second coupler being connected to the baseband processing module, the radio frequency front-end module, the first monitoring circuit, the power supply circuit, and the first-stage remote unit in the second remote cascaded chain respectively; wherein the first coupler couples an uplink and downlink switching signal generated by the baseband processing module to the first downlink analog radio frequency signal, couples a power supply signal generated by the power supply circuit to the first downlink analog radio frequency signal, performs interaction of a monitoring signal generated by the first monitoring circuit with the first-stage remote unit in the first remote cascaded chain, and performs analog radio frequency signal interaction with the first-stage remote unit in the first remote cascaded chain;

the second coupler couples an uplink and downlink switching signal generated by the baseband processing module to the second downlink analog radio frequency signal, couples a power supply signal generated by the power supply circuit to the second downlink analog radio frequency signal, performs interaction of a monitoring signal generated by the first monitoring circuit with the first-stage remote unit in the second remote cascaded chain, and performs analog radio frequency signal interaction with the first-stage remote unit in the second remote cascaded chain.

4. The distributed antenna system according to claim 1, wherein each remote unit in the first remote cascaded chain acquires a third uplink analog radio frequency signal transmitted by the terminal device and a fourth uplink analog radio frequency signal transmitted by a following-stage remote unit in a same remote cascaded chain, and combines the third uplink analog radio frequency signal and the fourth uplink analog radio frequency signal to obtain the at least one first uplink analog radio frequency signal;

the first-stage remote unit in the first remote cascaded chain further transmits the at least one first uplink analog radio frequency signal to the digital-to-analog extended unit through a radio frequency cable;

the remaining remote units in the first remote cascaded chain except the first-stage remote unit transmit the at least one first uplink analog radio frequency signal as the fourth uplink analog radio frequency signal to previous-stage remote units in the same remote cascaded chain through a radio frequency cable;

each remote unit in the second remote cascaded chain acquires a fifth uplink analog radio frequency signal transmitted by the terminal device and a sixth uplink analog radio frequency signal transmitted by a following-stage remote unit in a same remote cascaded chain, and combines the fifth uplink analog radio frequency signal and the sixth uplink analog radio frequency signal to obtain the at least one second uplink analog radio frequency signal;

the first-stage remote unit in the second remote cascaded chain transmits the at least one second uplink analog radio frequency signal to the digital-to-analog extended unit through a radio frequency cable; and the remaining remote units in the second remote cascaded chain except the first-stage remote unit transmit the at least one second uplink analog radio frequency signal as the sixth uplink analog radio frequency signal to a previous-stage remote unit in the same remote cascaded chain through a radio frequency cable.

5. The distributed antenna system according to claim 1, wherein, when the first remote cascaded chain or the second remote cascaded chain comprises a plurality of remote units, the plurality of remote units in a same remote cascaded chain are in cascaded connection through a radio frequency cable.

6. The distributed antenna system according to claim 1, wherein when the distributed antenna system is a 2T2R distributed antenna system, the remote unit in the first remote cascaded chain comprises one communication link module, and the remote unit in the second remote cascaded chain comprises one communication link module; and when the distributed antenna system is a 4T4R distributed antenna system, the remote unit in the first remote cascaded chain comprises two communication link modules, and the remote unit in the second remote cascaded chain comprises two communication link modules.

7. The distributed antenna system according to claim 6, wherein the communication link module comprises: a third coupler and a radio frequency signal link processing circuit;

the third coupler in the first-stage remote unit is connected to the digital-to-analog extended unit, and the third couplers in the remaining remote units except the first-stage remote unit are each connected to a following-stage remote unit in a same remote cascaded chain; and the third coupler performs analog radio frequency signal interaction with the digital-to-analog extended unit and performs analog radio frequency signal interaction with the following-stage remote unit in the same remote cascaded chain.

8. The distributed antenna system according to claim 7, wherein the communication link module further comprises: an uplink switching signal circuit, a power conversion circuit, and a second monitoring circuit;

the third coupler is connected to the uplink switching signal circuit, the power conversion circuit, and the second monitoring circuit respectively; and the third coupler acquires a power supply signal, acquires an uplink and downlink switching signal, and performs monitoring signal interaction with the digital-to-analog extended unit.

9. A signal transmission method, wherein the method is applied to a distributed antenna system, the distributed antenna system comprising: a digital-to-analog extended unit, a first remote cascaded chain corresponding to a first channel set, and a second remote cascaded chain corresponding to a second channel set, each remote unit in the first remote cascaded chain and the second remote cascaded chain being provided with communication link modules, a number of the communication link modules in each remote unit being less than a number of channels, the remote units in the first remote cascaded chain being arranged adjacent to the remote units in the second remote cascaded chain, a first-stage remote unit in the first remote cascaded chain being connected to the digital-to-analog extended unit through a radio frequency cable, and a first-stage remote unit in the second remote cascaded chain being connected to the digital-to-analog extended unit through a radio frequency cable; and wherein the method comprises:

acquiring, by the digital-to-analog extended unit, a downlink digital radio frequency signal from a source unit;

performing, by the digital-to-analog extended unit, a baseband processing operation and a digital-to-analog conversion operation on the downlink digital radio frequency signal, to obtain at least one first downlink analog radio frequency signal and at least one second downlink analog radio frequency signal;

transmitting, by the digital-to-analog extended unit, the at least one first downlink analog radio frequency signal to the first remote cascaded chain, and transmitting the at least one second downlink analog radio frequency signal to the second remote cascaded chain;

performing, by the first remote cascaded chain, analog radio frequency signal interaction with a terminal device based on the at least one first downlink analog radio frequency signal;

performing, by the second remote cascaded chain, analog radio frequency signal interaction with the terminal device based on the at least one second downlink analog radio frequency signal;

transmitting, by the first remote cascaded chain, at least one first uplink analog radio frequency signal to the digital-to-analog extended unit;

transmitting, by the second remote cascaded chain, at least one second uplink analog radio frequency signal to the digital-to-analog extended unit;

performing, by the digital-to-analog extended unit, an analog-to-digital conversion operation and a baseband processing operation on the at least one first uplink analog radio frequency signal and the at least one second uplink analog radio frequency signal, to obtain an uplink digital radio frequency signal; and transmitting, by the digital-to-analog extended unit, the uplink digital radio frequency signal to the source unit.

10. The method according to claim 9, wherein the method further comprises:

acquiring, by the first-stage remote unit in the first remote cascaded chain, a third uplink analog radio frequency signal from the terminal device, and acquiring a fourth uplink analog radio frequency signal from a following-stage remote unit in a same remote cascaded chain;

combining, by the first-stage remote unit in the first remote cascaded chain, the third uplink analog radio frequency signal and the fourth uplink analog radio frequency signal to obtain the at least one first uplink analog radio frequency signal;

transmitting, by the first-stage remote unit in the first remote cascaded chain, the at least one first uplink analog radio frequency signal to the digital-to-analog extended unit;

acquiring, by the first-stage remote unit in the second remote cascaded chain, a fifth uplink analog radio frequency signal from the terminal device, and acquiring a sixth uplink analog radio frequency signal from a following-stage remote unit in a same remote cascaded chain;

combining, by the first-stage remote unit in the second remote cascaded chain, the fifth uplink analog radio frequency signal and the sixth uplink analog radio frequency signal to obtain the at least one second uplink analog radio frequency signal; and transmitting, by the first-stage remote unit in the second remote cascaded chain, the at least one second uplink analog radio frequency signal to the digital-to-analog extended unit.

11. The method according to claim 10, wherein, for one remote unit of the remaining remote units in the first remote cascaded chain except the first-stage remote unit, the method further comprises:

acquiring, by the remote unit, the third uplink analog radio frequency signal from the terminal device, and acquiring the fourth uplink analog radio frequency signal from the following-stage remote unit in the same remote cascaded chain;

combining, by the remote unit, the third uplink analog radio frequency signal and the fourth uplink analog radio frequency signal to obtain the at least one first uplink analog radio frequency signal;

determining, by the remote unit, the at least one first uplink analog radio frequency signal as the fourth uplink analog radio frequency signal of the remote unit; and transmitting, by the remote unit, the fourth uplink analog radio frequency signal to a previous-stage remote unit in the same remote cascaded chain;

for one remote unit of the remaining remote units in the second remote cascaded chain except the first-stage remote unit, the method further comprises:

acquiring, by the remote unit, the fifth uplink analog radio frequency signal from the terminal device, and acquiring the sixth uplink analog radio frequency signal from the following-stage remote unit in the same remote cascaded chain;

combining, by the remote unit, the fifth uplink analog radio frequency signal and the sixth uplink analog radio frequency signal to obtain the at least one second uplink analog radio frequency signal;

determining, by the remote unit, the at least one second uplink analog radio frequency signal as the sixth uplink analog radio frequency signal of the remote unit; and transmitting, by the remote unit, the sixth uplink analog radio frequency signal to a previous-stage remote unit in the same remote cascaded chain.

* * * * *